(12) United States Patent
Oksanen et al.

(10) Patent No.: US 10,020,556 B2
(45) Date of Patent: Jul. 10, 2018

(54) DEFORMABLE APPARATUS

(75) Inventors: Markku Anttoni Oksanen, Helsinki (FI); Pekka Martti Tapio Ikonen, Espoo (FI); Jussi Olavi Rahola, Espoo (FI); Jaakko Timonen, Espoo (FI); Reijo Lehtiniemi, Helsinki (FI); Markku Heino, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1194 days.

(21) Appl. No.: 13/510,616

(22) PCT Filed: Nov. 19, 2009

(86) PCT No.: PCT/EP2009/065514
§ 371 (c)(1),
(2), (4) Date: Sep. 5, 2012

(87) PCT Pub. No.: WO2011/060825
PCT Pub. Date: May 26, 2011

(65) Prior Publication Data
US 2012/0326937 A1  Dec. 27, 2012

(51) Int. Cl.
*H01Q 1/24* (2006.01)
*H01Q 1/08* (2006.01)
(Continued)

(52) U.S. Cl.
CPC ............ *H01Q 1/085* (2013.01); *B82Y 25/00* (2013.01); *H01F 1/0063* (2013.01); *H01Q 1/08* (2013.01);
(Continued)

(58) Field of Classification Search
CPC .......... H01Q 1/085; H01Q 1/243; H01Q 1/08; B82Y 25/00; H01F 1/0063
(Continued)

(56) References Cited

U.S. PATENT DOCUMENTS 5,914,693 A    6/1999  Takei et al.
7,515,111 B2   4/2009  Tsujimura et al.
(Continued)

FOREIGN PATENT DOCUMENTS

DE       3919976 A1    12/1989
DE   202007001542 U1    6/2008
(Continued)

OTHER PUBLICATIONS

Lee, K.H., Lee, H.Y., Jeung, W.Y., Lee, W.Y., "Maggnetic properties and crystal structures of self-ordered ferromagnetic nanowires by ac electroforming", May 2002, Journal of Applied Physics, vol. 91, Issue 10, pp. 8513-8515.*

(Continued)

*Primary Examiner* — Daniel J Munoz
*Assistant Examiner* — Hai Tran
(74) *Attorney, Agent, or Firm* — Harrington & Smith

(57) ABSTRACT

An apparatus comprising: a deformable antenna configured to operate in a first physical configuration and configured to operate in a second physical configuration that is deformed relative to the first physical configuration; and magnetic material located in close proximity to the deformable antenna and configured to have a first physical configuration when the deformable antenna is in its first physical configuration and configured to have a second physical configuration that is deformed relative to the first physical configuration when the deformable antenna is in its second physical configuration, wherein the magnetic material when in its first physical configuration has a first magnetic permeability and when in its second physical configuration has a second magnetic permeability.

21 Claims, 2 Drawing Sheets

(51) Int. Cl.
    *B82Y 25/00*     (2011.01)
    *H01F 1/00*      (2006.01)
(52) U.S. Cl.
    CPC ........ *H01Q 1/243* (2013.01); *Y10T 29/49016* (2015.01)
(58) Field of Classification Search
    USPC .......................... 343/866, 702, 787; 264/464
    See application file for complete search history.

(56)                References Cited

U.S. PATENT DOCUMENTS

| | | | |
|---|---|---|---|
| 2004/0090868 A1* | 5/2004 | Endo ..................... | G04G 21/04 368/10 |
| 2005/0040997 A1* | 2/2005 | Akiho et al. .................. | 343/866 |
| 2006/0262030 A1 | 11/2006 | Bae et al. | |
| 2007/0102663 A1 | 5/2007 | Xiao et al. | |
| 2007/0273600 A1* | 11/2007 | Tsujimura et al. ........... | 343/787 |
| 2007/0279299 A1* | 12/2007 | Aoyama et al. ............. | 343/702 |
| 2008/0110342 A1* | 5/2008 | Ensor et al. ....................... | 96/54 |
| 2008/0143625 A1 | 6/2008 | Mizushima et al. | |
| 2009/0128437 A1 | 5/2009 | Sonoda et al. | |

FOREIGN PATENT DOCUMENTS

| | | |
|---|---|---|
| JP | 2004-312459 A | 11/2004 |
| JP | 2005-236858 A | 9/2005 |

OTHER PUBLICATIONS

Mahanfar et al., "Smart Antennas Using Electro-Active Polymers for Deformable Parasitic Elements", Electronics Letters, vol. 44, Issue No. 19, Sep. 11, 2008, 2 pages.

Liu et al., "Liquid Crystal Tunable Microstrip Patch Antenna", Electronics Letters, vol. 44, Issue No. 20, Sep. 25, 2008, 2 pages.

Brown et al., "Patch Antennas on Ferromagnetic Substrates", IEEE Transactions on Antennas and Propagation, vol. 47, Issue No. 1, Jan. 1999, pp. 26-32.

Sun et al., "Electronically Tunable Magnetic Patch Antennas With Metal Magnetic Films", Electronics Letters, vol. 43, Issue No. 8, Apr. 12, 2007, 2 pages.

Timonen et al., "Magnetically Responsive Hair by Self-Assembly of a Ferromagnetic Metal/Polymer Composite", 2009, pp. 1-8.

Raj et al., "Magnetic Nanocomposites for Organic Compatible Miniaturized Antennas and Inductors", Proceedings of International Symposium on Advanced Packaging Materials: Processes, Properties and Interfaces, Mar. 16-18, 2005, 4 pages.

Xiao et al., "Magnetic Nanocomposite Paste: An Ideal High-m, K and Q Nanomaterial for Miniaturized Antennas and Inductors", Nano Science & Technology Institute, Retrieved on May 22, 2013, Webpage available at: www.nsti.org/BioNano2005/showabstract.html?absno=1060.

International Search Report and Written Opinion received for corresponding International Patent Application No. PCT/EP2009/065514, dated Aug. 12, 2010, 11 pages.

Lee et al., "Magnetic Properties and Crystal Structures of Self-Ordered Ferromagnetic Nanowires by AC Electroforming", Journal of Applied Physics, vol. 91, Issue No. 10, May 15, 2002, pp. 8513-8515.

Ahmad Faizan, "Absolute and Relative Magnetic Permeability", Electrical Academia, 2018, downloaded from http://electricalacademia.com/electromagnetism/magnetic-permeability-absolute-and-relative permeability/, Jan. 8, 2018.

Colonel Wm. T. McLyman, Kg Magnetics, Inc., Transformer and Inductor Design Handbook, Third Edition, Revised and Expanded, "Chapter 1: Fundamentals of Magnetics", copyright by Marcel Dekker (2004).

Stan Zurek, "Effective magnetic permeability", Encyclopedia Magnetica: Encyclopedia of magnetics and electromagnetics (2017), downloaded on Jan. 8, 2018.

\* cited by examiner

DEFORMABLE APPARATUS

RELATED APPLICATION

This application was originally filed as PCT Application No. PCT/EP2009/065514 filed Nov. 19, 2009.

FIELD OF THE INVENTION

Embodiments of the present invention relate to a deformable apparatus, particularly a radio apparatus.

BACKGROUND TO THE INVENTION

When an antenna is deformed it typically results in a change in the antenna's operational characteristics.

BRIEF DESCRIPTION OF VARIOUS EMBODIMENTS OF THE INVENTION

According to various, but not necessarily all, embodiments of the invention there is provided an apparatus comprising: a deformable antenna configured to operate in a first physical configuration and configured to operate in a second physical configuration that is deformed relative to the first physical configuration; and magnetic material located in close proximity to the deformable antenna and configured to have a first physical configuration when the deformable antenna is in its first physical configuration and configured to have a second physical configuration that is deformed relative to the first physical configuration when the deformable antenna is in its second physical configuration, wherein the magnetic material when in its first physical configuration has a first magnetic permeability and when in its second physical configuration has a second magnetic permeability.

According to various, but not necessarily all, embodiments of the invention there is provided a method of manufacturing an antenna arrangement comprising a deformable antenna and associated magnetic material, the method comprising: obtaining nanomagnetic particles; mixing nanomagnetic particles with polymer; creating ordered nanostructures from the nanomagnetic particles.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1A:
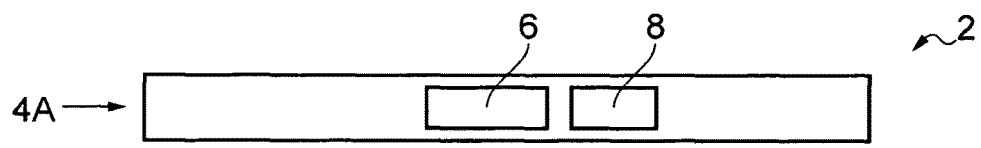
FIGS. 1A and 1B schematically illustrate a deformable apparatus comprising a deformable antenna and magnetic material in first and second physical configurations.
Figure 1B:
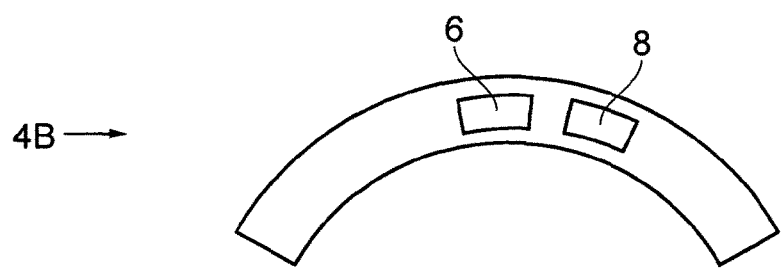
Figure 2A:
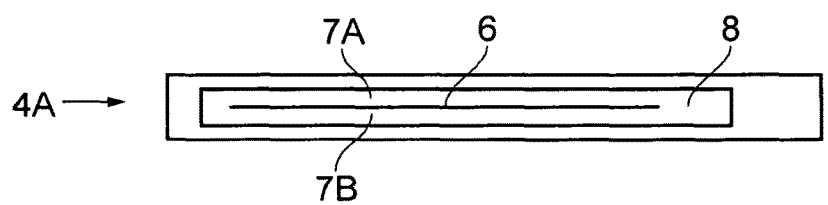
FIGS. 2A and 2B schematically illustrate one example of a deformable apparatus comprising a deformable antenna and magnetic material in first and second physical configurations.
Figure 2B:
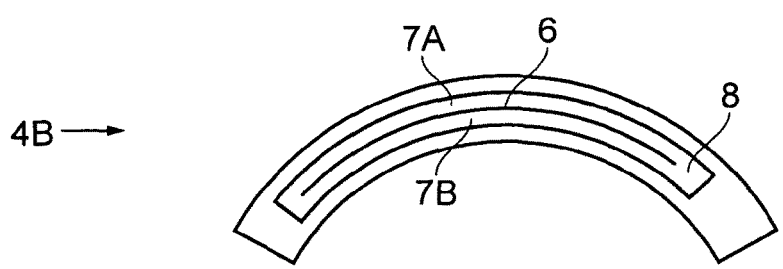

FIGS. 1A and 1B and also FIGS. 2A and 2B, schematically illustrate a deformable apparatus 2 comprising: a deformable antenna 6 and magnetic material 8 located in close proximity to the deformable antenna 6.

The magnetic material is located close enough to the antenna 6 and, in particular, the portions of the antenna 6 where the current density is high, so that the operational characteristics of the antenna 6 are influenced by the magnetic material.

Operational characteristics of the antenna 6 may include one or more of: input impedance, impedance bandwidth, resonance frequency, operational bandwidth, radiation pattern (gain, directivity, etc) and efficiency. Operational bandwidth is a frequency range over which an antenna can efficiently operate. Efficient operation occurs, for example, when the antenna's insertion reflection coefficient S11 is greater than an operational threshold such as 4 dB or 6 dB.

When the apparatus 2 is deformed, the consequential deformation of the antenna 6 results in a change in the operational characteristics of the antenna 6 and the consequential deformation of the magnetic material 8 results in a change in the operational characteristics of the antenna 6. By design, the change in the operational characteristics of the antenna 6 resulting from deformation of the antenna may be compensated by the change in the operational characteristics of the antenna resulting from deformation of the magnetic material 8.

The apparatus 2 may be a portable apparatus such as a hand-portable radio terminal such as a mobile cellular telephone, wireless local area network terminal, Bluetooth device etc. The apparatus 2 may be a 'module' such as an unit or apparatus that excludes certain parts/components that would be added by an end manufacturer or a user. Alternatively, the apparatus 2 may be an end product.

In one implementation, the apparatus 2 may be designed as a wristband or similar which is bent to conform to a user's wrist.

As can be seen from FIGS. 1A and 1B and also from FIGS. 2A and 2B, the deformable apparatus 2 is configured to have a first physical configuration 4A and a second, different, physical configuration 4B. In the examples illustrated, the user changes the configuration of the apparatus 2 from the first configuration 4A to the second configuration 4B by bending the apparatus 2. It should, however, be appreciated that there are many other ways of changing the configuration of an apparatus 2, for example, there may be more than two physical configurations of the deformable apparatus 2.

When the configurable apparatus 2 is in the first physical configuration 4A, the deformable antenna 6 and the magnetic material 8 are both in their respective first physical configuration. The magnetic material when in its first physical configuration has a first magnetic permeability. In the examples of FIGS. 1A and 2A, the deformable antenna 6 is in a non-deformed state and the magnetic material 8 is in a non-deformed state.

When the configurable apparatus 2 is in the second physical configuration 4B, the deformable antenna 6 and the magnetic material 8 are both in their respective second physical configuration. The magnetic material when in its second physical configuration has a second magnetic permeability that is different to the first magnetic permeability. In the examples of FIGS. 1B and 2B, the deformable antenna 6 is deformed and the magnetic material 8 is deformed.

The antenna 6 may be any suitable type of antenna. It may, for example, be a dipole antenna, or a monopole antenna, or a loop antenna, a planar inverted F antenna (PIFA), or a planar inverted L antenna (PILA), or a patch antenna, or an array of antennas, etc.

The change in magnetic permeability of the magnetic material 8 tunes the deformable antenna 6.

The arrangement of the magnetic material 8 may be determined by simulation for example. The performance of the deformable antenna 6 in the first and second physical configurations may be simulated using standard simulation techniques. A putative arrangement for the magnetic material 8 may then be defined. The electrical permeability of the magnetic material 8 in the first physical configuration and in the second configuration may, for example, be experimentally measured or theoretically determined for the putative arrangement. The simulation of the performance of the deformable antenna 6 may then be adapted by including the experimentally determined values for the magnetic permeability of the magnetic material 8 in the first and second physical configurations for the putative arrangement. The process may be repeated with different putative arrangements of the magnetic material 8 or with different magnetic materials until the desired performance characteristics are obtained for the first and second configurations. Different putative arrangements of the magnetic material 8 may have the magnetic material adjacent and in close proximity to only one side of the antenna 6 or adjacent and in close proximity to both sides of the antenna 6. Different putative arrangements of the magnetic material 8 may have the material in close proximity to only certain portions of the antenna 6. Different putative arrangements of the magnetic material 8 may have different thicknesses of the magnetic material 6. Different putative arrangements of the magnetic material 8 may have no separation between the antenna 6 and the magnetic material 8 or different but small separations between the magnetic material 8 and the antenna 6.

FIGS. 2A and 2B schematically illustrated an example of one of many possible implementations of an apparatus 2.

In this example, the arrangement of the magnetic material 8 is such that the antenna 6 is embedded within the magnetic material 8. The areas of high current density on the antenna surface are covered by the magnetic material 8.

In alternative embodiments, the antenna 6 may only be covered by a "superstate" (magnetic material 8 on the top surface of the antenna 6). In a further alternative embodiment, the antenna 6 may only be covered by a "substrate" (magnetic material 8 on the bottom surface of the antenna 6).

In each of these alternatives, the magnetic material 8 may be positioned between the antenna 6 and a ground plane.

In each of these alternatives, the magnetic material 8 may be touching or fixed to the antenna 6, or alternatively may be placed in close proximity but separated from the antenna 6.

Referring back to the example illustrated in FIGS. 2A and 2B, the magnetic material 8, in this example, has a first layer 7A on one side of the antenna 6 and a second layer 7B on the other side of the antenna 6. These first and second layers may be formed from the same or different magnetic materials. The thickness of the first and second layers may be the same or different. In some embodiments one of the first layer 7A and second layer 7B may be absent.

In the illustrated example, an increase in the resonant frequency caused by bending the antenna 6 is compensated by the magnetic material 8. Bending the antenna simultaneously compresses the magnetic material 8 increasing its magnetic permeability which in turn results in an at least partially compensating reduction of the resonant frequency.

Figure 3:
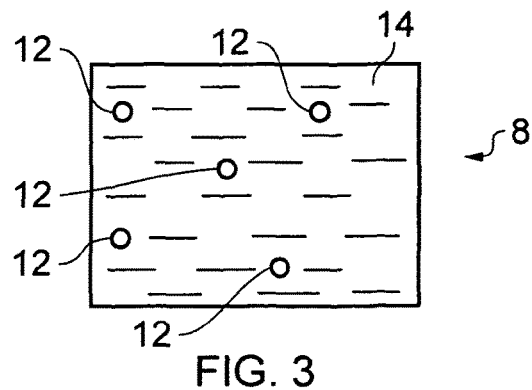
FIG. 3 schematically illustrates one embodiment of magnetic material.
Figure 4A:
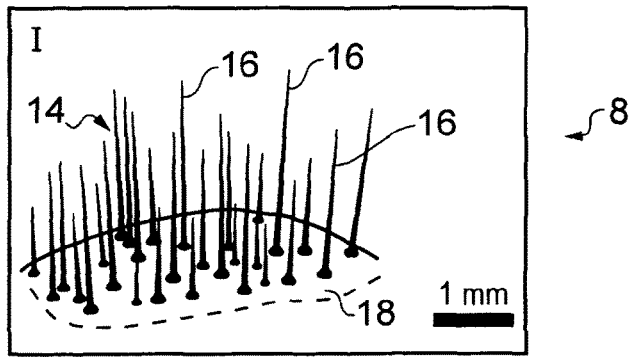
FIGS. 4A and 4B schematically illustrate another embodiment of magnetic material.
Figure 4B:
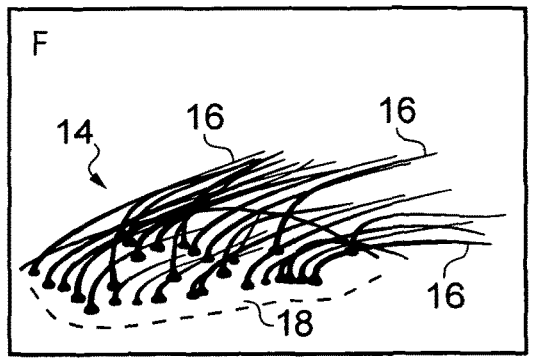

The magnetic material 8 may comprise nanomagnetic particles 12 in a supporting, deformable matrix 14 as illustrated in FIGS. 3, 4A and 4B. The particles 12 are present in low densities so that compression/expansion of the matrix 14 results in a significant percentage change in density and hence magnetic permeability.

A nano particle is a particle that has a minimum dimension that is less than 1 μm. Some nano-particles may have a minimum dimension less than 10 nm.

A magnetic particle is a particle with a magnetic permeability greater than 1.

A nanomagnetic particle is a particle that has a minimum dimension that is less than 1 μm and a magnetic permeability greater than 1.

The particles 12 may be formed from ferromagnetic material which has very large magnetic permeabilities. For example, the particles may include Cobalt (Co), Iron (Fe) or Nickel (Ni).

The magnetic material 8 is passive. The material 8 is actuated by deformation and there is no requirement to apply a field (electric or magnetic) to obtain the required change in magnetic permeability.

Figure 5:
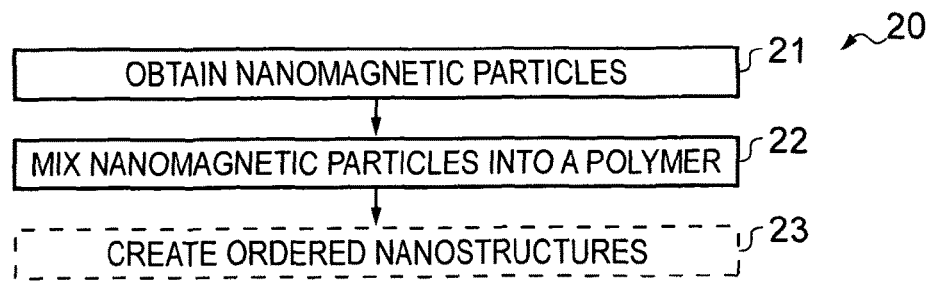
FIG. 5 schematically illustrates a method of manufacturing magnetic material.

FIG. 5 schematically illustrates a method 20 for manufacturing magnetic material 8.

At block 21, nanomagnetic particles 12 are obtained.

At block 22, the nanomagnetic particles 12 are mixed with polymer.

Then at block 23, ordered nanostructures are created from the nanomagnetic particles 12.

FIG. 3 schematically illustrates one embodiment in which the nanomagnetic particles 12 form an unordered distribution of nanomagnetic particles 12 within a deformable matrix 14.

In alternative embodiments, the nanomagnetic particles 12 may be used to create an ordered distribution of nanomagnetic particles within the matrix 14. This ordered distribution produces elongate structures having a length to width aspect ratio greater than ten. The aspect ration may be >100 and even as high as 1000. The elongate structures may have a length of the order 1 mm or greater.

According to one manufacturing method, the ordered structure comprises electrospun fibres comprising nanomagnetic particles 12. Ceramic filler nanoparticles may be added prior to forming the fibres to engineer the properties of the magnetic material 8.

According to this manufacturing method, nanomagnetic particles such as Fe, Co, Ni, alloys like FePt, oxides like $Fe_3O_4$ may be used as the nanomagnetic particles.

The nanomagnetic particles 12 are mixed with polymer solution, e.g. polyacrylonitrile in dimethylformamide or polystyrene in toluene and then electrospun. The fibres produced may be less than 100 nm in diameter.

It is also possible to use other polymers from solution such as polystyrene, syndiotactic polystyrene, polyethylenes, polypropylene, cyclic olefin copolymer or fluoropolymers. Polyolefins may be used to electrospin from melt.

Ceramic filler nanoparticles such as barium titanate, alumina, and silica may be added to the polymer before spinning to increase permittivity.

When magnetic materials of this type are compressed the magnetic permeability increases. The increase is non-linear and permeability increases faster than for a linear increase.

According to another manufacturing method, the ordered structure comprises nanostructures formed from the nanomagnetic particles in the presence of a strong magnetic field. "*Magnetically Responsive Hair by Self-Assembly of a ferromagnetic metal/polymer composite*" Jaakko Timonen et al describes a suitable methodology for manufacturing magnetic material 8 in which ferromagnetic cobalt particles are mixed with polybutadiene or Kraton D elastomer in the presence of magnetic field.

In more detail, cobalt nanoparticles are dispersed in toluene by sonication.

A polymer is then added and sonication performed. A suitable polymer is cis-polybutadiene or poly(styrene-b-isoprene-b-styrene). The suspension is then placed into a wide area polytetrafluoroethylene (PTFE) container. The container is placed over a high power magnet e.g. >1 T and rapidly lowered onto or near to the magnet. The container remains there for several days while the toluene evaporates and form 'hairs' 16 as illustrated in FIGS. 4A and 4B. The hairs are typically 1-2 mm long with a diameter between 1 and 100 μm in diameter.

The density of hairs 16 may be controlled by controlling the distance of the container from the magnet. The smaller the separation, the more dense the hairs. The greater the separation, the less dense the hairs.

The diameter of the hairs may be controlled by the distance of the container from the magnet and also by the quantity of nanomagnetic particles.

Referring to FIGS. 4A and 4B, it can be seen that the magnetic material 8 comprises a set of standing wires or hairs. The space between the wires/hairs may be filled with a flexible polymer.

In some embodiments, the apparatus 2 is configured to apply a shear force perpendicular to the standing wires/hairs. This force will 'topple' the resiliently flexible wires (FIG. 4B) lowering the magnetic permeability. Compression of this material therefore lowers magnetic permeability.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A hand-portable radio terminal comprising:
    a deformable antenna disposed in the radio terminal and configured to operate in a first antenna physical configuration and configured to operate in a second antenna physical configuration that is deformed relative to the first antenna physical configuration; and
    magnetic material located in close proximity to the deformable antenna and configured to have a first magnetic material physical configuration when the deformable antenna is in its first antenna physical configuration and configured to have a second magnetic material physical configuration that is deformed relative to the first magnetic material physical configuration when the deformable antenna is in its second antenna physical configuration, wherein the magnetic material when in its first magnetic material physical configuration has a first relative magnetic permeability and when in its second magnetic material physical configuration has a second relative magnetic permeability,
    wherein the hand-portable radio terminal is configurable to have a first physical configuration and a second, different, physical configuration wherein when the configurable hand-portable radio terminal is in the first physical configuration the deformable antenna and the magnetic material are both in their respective first antenna and first magnetic material configurations and when the configurable hand-portable radio terminal is in the second physical configuration the deformable antenna and the magnetic material are both in their respective second antenna and second magnetic material configurations.

2. An hand-portable radio terminal as claimed in claim 1, wherein the change in relative magnetic permeability of the magnetic material between the first and second magnetic material configurations tunes the deformable antenna.

3. The hand-portable radio terminal as claimed in claim 1, wherein the magnetic material comprises nanomagnetic particles in a supporting, deformable matrix.

4. The hand-portable radio terminal as claimed in claim 3, wherein the nanomagnetic particles form an unordered distribution of nanomagnetic particles within the deformable matrix.

5. The hand-portable radio terminal as claimed in claim 3 wherein the nanomagnetic particles form an ordered distribution of nanomagnetic particles within the deformable matrix.

6. The hand-portable radio terminal as claimed in claim 5, wherein the ordered distribution includes elongate structures having a length to width aspect ratio greater than ten.

7. The hand-portable radio terminal as claimed in claim 6, wherein each elongate structure has a length of 1 mm or greater.

8. The hand-portable radio terminal as claimed in claim 5, wherein an ordered distribution comprises electrospun fibers comprising nanomagnetic particles.

9. The hand-portable radio terminal as claimed in claim 8, wherein the ordered distribution additionally comprises ceramic filler nanoparticles.

10. The hand-portable radio terminal as claimed in claim 1, wherein the magnetic material comprises a set of standing wires and the space between the wires is filled with polymer.

11. The hand-portable radio terminal as claimed in claim 10, wherein the hand-portable radio terminal is configured to apply a shear force perpendicular to the standing wires.

12. The hand-portable radio terminal as claimed in claim 1, wherein the magnetic material comprises nanomagnetic particles that are ferromagnetic or superparamagnetic.

13. The hand-portable radio terminal as claimed in claim 1, wherein the magnetic material comprises nanomagnetic particles that have a minimum dimension of less than 10 nm.

14. The hand-portable radio terminal as claimed in claim 1, wherein the relative magnetic permeability of the magnetic material changes between the first and the second relative magnetic permeability due to the magnetic material changing between the respective first and second magnetic material configurations and not due to any applied electric or magnetic field.

15. An apparatus comprising:
    a deformable antenna configured to operate in a first antenna physical configuration and configured to operate in a second antenna physical configuration that is deformed relative to the first antenna physical configuration; and magnetic material located in close proximity to the deformable antenna and configured to have a first magnetic material physical configuration when the deformable antenna is in its first antenna physical configuration and configured to have a second magnetic material physical configuration that is deformed relative to the first magnetic material physical configuration when the deformable antenna is in its second antenna physical configuration, wherein the magnetic material when in its first magnetic material physical configuration has a first magnetic permeability and when in its second magnetic material physical configuration has a second magnetic permeability, wherein a change in resonant frequency caused by deformation of the deformable antenna between the first and second antenna physical configurations is compensated by the simultaneous deformation of the magnetic material between the first and second magnetic material physical configurations.

16. The apparatus as claimed in claim 15, wherein the antenna is embedded in the magnetic material.

17. A method of manufacturing an antenna arrangement comprising a deformable antenna and associated magnetic material, the method comprising:
obtaining nanomagnetic particles;
mixing nanomagnetic particles with polymer;
creating ordered nano structures from the nanomagnetic particles to form a magnetic material; and
disposing the magnetic material within or on a deformable hand-portable radio terminal in close proximity to a deformable antenna, wherein:

the hand-portable radio terminal is deformable between a first physical configuration and a second, different, physical configuration;

the deformable antenna is configured to operate in a first antenna physical configuration when the hand-portable radio terminal is in the first physical configuration, and configured to operate in a second antenna physical configuration that is deformed relative to the first antenna physical configuration when the hand-portable radio terminal is in the second physical configuration;

the magnetic material is configured to have a first magnetic material physical configuration when the hand-portable radio terminal is in the first physical configuration, and configured to have a second magnetic material physical configuration that is deformed relative to the first magnetic material physical configuration when the hand-portable radio terminal is in the second physical configuration; and the magnetic material has a first magnetic permeability when in the first magnetic material physical configuration, and has a second magnetic permeability when in the second magnetic material physical configuration.

18. A method as claimed in claim 17, wherein ordered nanostructures are created by electrospinning.

19. A method as claimed in claim 17, further comprising adding ceramic filler nanoparticles.

20. A method as claimed in claim 17, wherein ordered nano structures are created in the presence of a magnetic field.

21. A method as claimed in claim 20, wherein each ordered nano structure has a length of 1 mm or greater.

* * * * *